United States Patent

[11] 3,611,099

| | | |
|---|---|---|
| [72] | Inventor | Toshinobu Kuroyama<br>Toyota, Japan |
| [21] | Appl. No. | 882,923 |
| [22] | Filed | Dec. 8, 1969 |
| [45] | Patented | Oct. 5, 1971 |
| [73] | Assignee | Toyota Jidosha Kogyo Kabushiki Kaisha<br>Toyoda City, Aichi Prefecture, Japan |
| [32] | Priority | Dec. 7, 1968, Dec. 10, 1968 |
| [33] | | Japan |
| [31] | | 43/106889 and 43/107711 |

[54] POWERED WINDOW REGULATOR
2 Claims, 2 Drawing Figs.

[52] U.S. Cl. ..................................................... 318/476
[51] Int. Cl. ..................................................... H02h 7/085
[50] Field of Search........................................... 318/265,
266, 286, 466, 469, 267, 476

[56] References Cited
UNITED STATES PATENTS
3,513,374  5/1970  Koment.......................... 318/266

*Primary Examiner*—Benjamin Dobeck
*Assistant Examiner*—W. E. Duncanson, Jr.
*Attorney*—Connolly and Hutz ABSTRACT: Powered window regulator comprises motor assembly having window raising and window-lowering circuits for raising and lowering window glass. Start switch for motor has contact for connecting window-raising circuit with motor and second contact for connecting window-lowering circuit with motor. Overload detection switch associated with motor closes when load on motor exceeds predetermined normal value. Motor field control relay is activated when overload detection switch is closed to thereby break window-raising circuit and close window-lowering circuit. Delay relay circuit maintains motor field control relay activated predetermined time after overload detection switch opens whereby window glass continues to lower. Safety circuit cancel switch enables raising of window glass regardless of load on motor.

3,611,099

POWERED WINDOW REGULATOR

BACKGROUND OF THE INVENTION

In a powered window regulator for raising and lowering the window glass of an automobile, for example, if the motor switch is not manually changed to lower the window when a hand or arm or other human body parts are lodged between the window glass and the window frame, elevation of the window glass continues under the strong power of the motor. Often, the part of the human body lodged between the glass and the window frame is strongly squeezed thereby resulting in serious injury or even death when the body member happens to be the neck.

Accordingly, the major object of the present invention s to prevent injury to any part of the human body stuck or otherwise lodged between the window glass and the window frame when the window is in the process of being elevated. The upward movement of the window glass is automatically reversed when the load on the motor used to raise or lower the window glass increases.

Another object of the present invention is to assure that the window glass continues to lower for a certain period of time even after the window glass starts its automatic descent in response to an increased load on the motor used to raise and lower the window glass. The automatic lowering of the window glass occurs even in cases where the motor switch manually turns off. The window glass is lowered a sufficient distance to free the stuck part of human body and prevent it from being trapped again between the window glass and the frame.

Still another object of the present invention is to provide a safety circuit cancel switch which enables the window glass to be raised even under an increased load on the motor when that load is caused by freezing, for example, or some cause other than a human body member lodged between the glass and the frame. Without this feature the window glass would be lowered to its limit and could not be elevated.

SUMMARY OF THE INVENTION

In accordance with the present invention a powered window regulator comprising a motor assembly including a window raising and window-lowering circuits for raising and lowering a window glass. A start switch for the motor has a first contact for connecting the window-raising circuit with the motor and the second contact for connecting the window-lowering circuit with the motor. An overload detection switch associated with the motor is arranged to close when the load on the motor exceeds a predetermined normal value. A motor field control relay is activated when the overload detection switch is closed for breaking the window raising circuit and closing the window-lowering circuit of the motor assembly. A delay relay circuit associated with the motor field control relay maintains the control relay activated a predetermined time after the overload detection switch opens so that the window glass continues to lower. A manually operable safety circuit cancel switch activates the motor field control relay so that the window glass may be raised to its fully closed position by the motor assembly regardless of the load on the motor.

BRIEF DESCRIPTION OF THE DRAWING

Novel features and advantages of the present invention in addition to those mentioned above will become apparent to those skilled in the art from a reading of the following detailed description in conjunction with the accompanying drawing wherein similar reference characters refer to similar parts and in which.

DETAILED DESCRIPTION OF THE INVENTION

Figure 1:
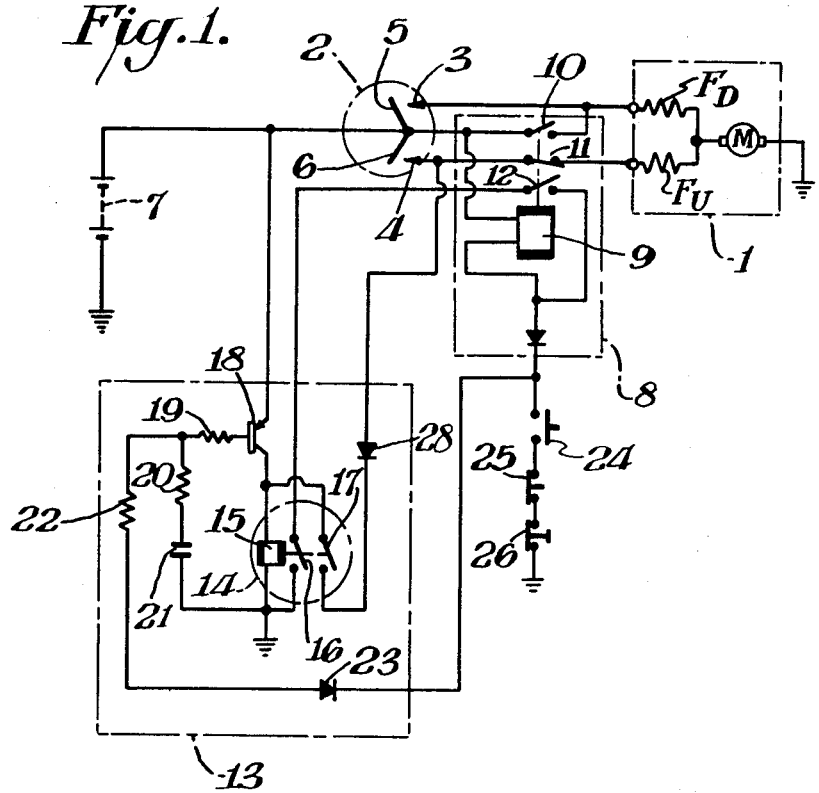
FIG. 1 is a circuit diagram of an embodiment of the present invention.

In FIG. 1, a motor assembly 1 is the power unit for raising and lowering a window glass. The motor assembly 1 includes a motor rotor M, a field coil $F_D$ for lowering purposes and a field coil $F_U$ for raising the window. When the rotor M rotates, the window glass is moved up or down through a mechanical transmission such as pulleys and wires, for example (not shown). FIG. 1 also shows a manual switch 2, a fixed contact 3 for lowering, and a fixed contact 4 for raising. Manually operated movable contacts 5, 6 are connected to a power source 7. The movable contact 5 is opposite the fixed contact 3 and the movable contact 6 is opposite the fixed contact 4.

A motor field control relay 8 is also provided comprising a relay coil 9 and relay 10, 11, 12. When the relay coil 9 is deenergized, the relay contacts 10, 12 are open and the relay contact 11 is closed. When the relay coil 9 is energized, the relay contacts 10, 12 are closed and the relay contact 11 is opened. A delay relay circuit 13 is provided comprising a relay 14. The relay 14 contains a relay coil 15 and relay contacts 16, 17. When the relay coil 15 is deenergized, the relay contacts 16, 17 are open, and when the relay coil 15 is energized the relay contacts 16, 17 are closed.

The delay circuit 13 additionally has a transistor 18 with emitter thereof connected to the power source 7 and the collector connected to the relay coil 15 and the relay contact 17. The transistor 18 has its base connected to one end of a resistance 19. The other end of the resistance 19 is grounded via a resistance 20 and a condenser 21. Also that end of the resistance 19 is connected via a resistance 22 and a rectifier element 23 to the negative terminal of the relay coil 9.

An overload detection switch 24 opens the circuit when the load on the motor 1 is less than a predetermined value of force and closes the circuit when the load on the motor 1 exceeds that limit. The circuit is opened again when the load drops below the predetermined limit. The circuit for closing the overload detection switch 24 can be constructed in several ways. For instance, the circuit (not shown) closes the overload detection switch 24 by means of a microswitch which is pressed by force proportional to the load on the motor 1.

A window close detection switch 25 is providing for opening the circuit when the window is closed and closing the circuit when the window is opened.

A safety circuit cancel switch 226 permits the normally closed circuit to be manually opened.

The following is a description of the function of the device of FIG. 1.

a. Normal Operation

In order to close an open window, the operator presses the movable contact 6 of the start switch 2 against the fixed contact 4. The overload detection switch 24 is in open condition under which the relay coil 9 is deenergized and the relay contacts 10, 12 are open and the relay contact 11 is closed. When the movable contact 6 is connected to the fixed contact 4 for raising purposes, the current flows through the circuit of the power source 7, the movable contact 6, the fixed contact 4 for raising, the closed relay contact 11, the field coil $F_U$ for raising and the motor M. The rotor M of the motor 1 then rotates in the direction to elevate the window to its closed position.

Just as the window glass is about to reach the limit of its upper movement, the window close detection switch 25 opens. With the overload detection switch 24 remaining open from the first, an interruption of the current will not immediately follow the opening of the window close detection switch 25. When the window is fully shut, the operator disconnects the movable contact 6 from the fixed contact 4. The supply of current to the motor is thereby terminated and the window-closing operation is completed.

In order to open the window, the operator connects the movable contact 5 of the start switch 2 to the fixed contact 3 for lowering. Thereupon the current flows in the circuit of power source 7, the movable contact 5, the fixed contact 3 for lowering, the field coil $F_D$ for lowering, and the rotor M. The rotor M of the motor 1 then runs in the direction to open the window. The moment the operator disconnects the movable contact 5 from the fixed contact 3 for lowering, the current supply to the motor 1 ceases and the window-opening operation is completed.

b. Load Increases While the Window is Being Closed.

i. When the load on the motor 1 exceeds a predetermined limit while the window is being closed (movable contact 6 connected to fixed contact 4 for raising) as when a part of the human body is lodged between the window glass and the frame, the overload detection switch 24 closes. Upon the closing of the overload detection switch 24, the current flows in the circuit of the power source 7, the relay coil 9 of motor field control relay 8, the closed overload detection switch 24, the closed window close detection switch 25, and the closed safety circuit cancel switch 26, when the relay coil 9 is energized the relay contacts 10, 12 are closed and the relay contact 11 is opened.

Meanwhile, the condenser 21 in the delay relay circuit 13 is all the time impressed with a voltage of the power source 7 and charged. At the same time as the overload detection switch 24 closes, the charge of the condenser 21 is released through the resistances 20,22, the rectifier element 23, the overload detection switch 24, the window close detection switch 25 and the safety circuit cancel switch 26.

Upon the discharging of the condenser 21, a base current flows in the transistor 18 via the resistances 19, 22 and the transistor 18 becomes continuous. As a result, the relay coil 15 within the relay 14 is energized to close the relay contacts 16 and 17. When the relay contact 16 is closed, the minus side of the relay coil 9 of the motor field control relay 8 is connected via the relay contact 12 to the ground and thereby the self-holding circuit of the relay coil 9 is formed.

ii. If the movable contact 6 remains connected to the fixed contact 4 for raising, the voltage of the power source 7 continues to be applied from the fixed contact 4 via the rectifier element 28 and the relay contact 17 to the relay coil 15 and thereby the self-holding circuit of the relay coil 15 is formed. In consequence the relay contact 16 remains in a closed state to make the relay coil 9 hold itself. Accordingly, the relay contact 11 of the motor field control relay 8 remains open and as a result the current cannot flow to the field coil $F_{U}$ and the relay contact 10 remains closed. Thus, the current flows from the field coil $F_D$ for lowering to the rotor M and the window is lowered.

iii. Even if in the condition of (i) the movable contact 6 is detached from the fixed contact 4 for raising, the base current of the transistor 18 continues to flow via the resistances 19, 22, the overload detection switch 24, the window close detection switch 25, and the safety circuit cancel switch 26, as long as the overload detection switch 24 is closed. Accordingly, the relay coils 9 and 15 remain energized and the window begins to open.

As the window opens, the load on the motor 1 diminishes and the overload detection switch 24 opens. Since the charge current of the condenser 21 passing through the resistances 19, 20 continues to flow as the base current of the transistor 18, the relay coils 9 and 15 continue to be energized until the condenser 21 is charged. With the relay contact 10 closed, the current flows from the field coil $F_D$ for lowering to the rotor M. Thus the window continues to be lowered.

When the charge accumulates in the condenser 21 and the base current of the transistor 18 diminishes the transistor 18 becomes discontinuous. As a result, the energizing current of the relay coil 15 is interrupted to open the relay contact 16. Then, the self-holding circuit of the relay coil 9 is also cut off to deenergize the relay coil 9. With the relay contacts 10, 12 open and the relay contact 11 closed, the downward movement of the window glass is terminated and the apparatus returns to its original operating condition. When the movable contact 6 is connected to the fixed contact 4 for raising, the window glass will elevate to its closed position.

iv. The safety circuit cancel switch 26 is operated to enable the window glass to be closed when the overload detection switch 24 is closed due to increased loads on the motor 1 caused by freezing in winter, for example. After the safety circuit cancel switch 26 is manually opened, the relay coil 9 is deenergized and the relay contact 11 remains closed. When the movable contact 6 is connected to the fixed contact 4 for raising, the motor 1 will continue to elevate the window glass even if the overload detection switch 24 is closed. It is advisable that the safety circuit cancel switch 26 be located in a position inconvenient for operation, lest it should be operated indiscriminately.

Figure 2:
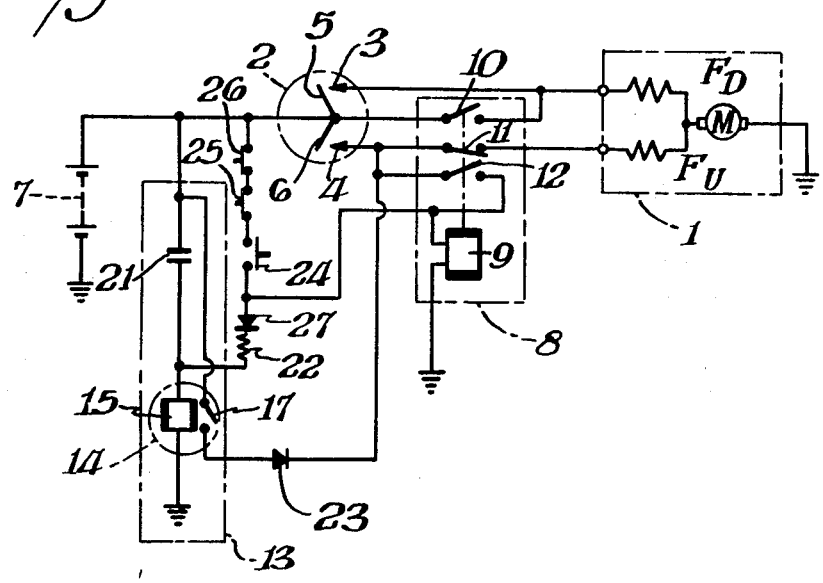
FIG. 2 is a circuit diagram of another embodiment of this invention.

FIG. 2 illustrates another embodiment of the present invention wherein similar parts are identified by similar reference characters. The relay coil 15 of the relay 14 is connected to the power source 7 via the condenser 21. A relay contact 17 opens when the relay coil 15 is deenergized and closes when the relay coil 15 is energized. A circuit is formed from the power source 7 via the relay contact 17 and the rectifier element 23 to the fixed contact 4 and the relay contact 12.

Also, a circuit if formed from the power source 7 via the normally closed safety circuit cancel switch 26, the window close detection switch 25, the normally open overload detection switch 24, the diode 27 and the resistance 22 to the plus side of the relay coil 15. The minus side of the overload detection switch 24 in this circuit is connected to the plus side of the relay coil 9 and the minus side of the relay contact 12.

The function of this apparatus is as follows.

a. Normal Operation

In order to elevate the window glass from its opened position, the operator connects the movable contact 6 of the start switch 2 to the fixed contact 4. Before this, the overload detection switch 24 is open, and with the relay coil 9 deenergized, the relay contacts 10, 12 are open and the relay contact 11 is closed. When the movable contact 6 is connected to the fixed contact 4 for raising, the current flows in the circuit of the power source 7, the movable contact 6, the fixed contact 4 for raising, the closed relay contact 11, the field coil $F_{U}$ for raising, and the rotor M. The rotor M of the motor 1 then runs in the direction to elevate the window glass.

When the elevating window glass is on the verge of fully closing, the window close detection switch 25 opens. With the overload detection switch 24 remaining open from the first, an interruption of the current will not take place even if the window close detection switch 25 opens. Upon the window glass being completely raised, the operator disconnects the movable contact 6 from the fixed contact 4. The current flow to the motor 1 is thereby broken and the window-closing operation is completed.

In opening the window, when the operator connects the movable contact 5 of the start switch 2 to the fixed contact 3 for lowering, the current flows in the circuit of the power source 7, the movable contact 5, the fixed contact 3 for lowering, the field coil $F_D$ for lowering, and the rotor M. The rotor M of the motor 1 then runs in the direction to lower the window glass. When the operator detaches the movable contact 5 from the fixed contact 3 for lowering, the current flow to the motor 1 is thereby broken and the window-closing operation is completed.

b. Load Increases While the Window is Being Closed.

i. When the load on the motor 1 exceeds a predetermined value after the movable contact 6 is connected to the fixed contact 4 for raising, as when a part of human body is lodged between the glass and the frame, the overload detection switch 24 closes. When the overload detection switch 24 is closed, the charge of the condenser 21 which is normally charged with the voltage of the power source 7 is released through the discharge circuit of the closed safety circuit cancel switch 26, the window close detection switch 25, the closed overload detection switch 24, the diode 27, the resistance 22, and the condenser 21. A voltage is then impressed on the relay coil 9 through the safety circuit cancel switch 26 and the window close detection switch 25, and the overload detection switch 24 to thereby energize the relay coil 9 to close the relay contacts 10, 12 and open the relay contact 11. When the condenser 21 is discharged, a voltage is also impressed on the relay coil 15 through the safety circuit cancel switch 26, the window close detection switch 25, the overload detection switch 24, the diode 27, and the resistance 22, but as it is so arranged that the current flowing in the relay coil 15 may be small, the relay coil 15 is not energized and the relay contact 17 remains open.

ii. If the movable contact 6 remains connected to the fixed contact 4 for raising, a voltage is impressed on the relay coil 9 through the power source 7, the movable contact 6, the fixed contact 4 for raising, and the closed relay contact 12, thereby forming a self-holding circuit of the relay coil 9.

With the relay coil 9 energized to close the relay contact 10 and open the relay contact 11, the current flows from the field coil $F_v$ for raising via the contact 10 and the field coil $F_D$ for lowering to the rotor M. The window glass is then lowered.

iii. When in the condition of (i) the movable contact 6 of the start switch 2 is detached from the fixed contact 4 for raising, a voltage continues to be impressed on the relay coil 9 from the power source 7 via the safety circuit cancel switch 26, the window close detection switch 25, and the overload detection switch 24 as long as the overload detection switch 24 remains closed. Thus, the relay contacts 10, 12 are closed and the relay contact 11 is opened. Accordingly, the current flows from the relay contact 10 to the field coil $F_D$ for lowering and the rotor M. The window glass moves downwardly.

As the load on the motor 1 diminishes with a lowering window glass, the overload detection switch 24 opens. This time the condenser 21 is charged from the power source 7 and the charge current energized the relay coil 15 thereby closing the relay contact 17. As a result, the current flows to the relay coil 9 from the power source 7 via the closed relay contact 17, the rectifier element 23, and the closed relay contact 12. The relay coil 9 is energized to close the relay contact 10 and the current then flows from the field coil $F_D$ to the rotor M. The window glass continues to move downwardly.

As the charge accumulates in the condenser 21, the current ceases to flow to the relay coil 15 The relay coil 15 is then deenergized to open the relay contact 17 thereby interrupting the current supply to the relay coil 9. In consequence, the relay contacts 10, 12 are opened and the relay contact 11 is closed. Thus, the window glass stops moving downwardly and the apparatus reverts to its normal condition.

iv. The safety circuit cancel switch 26 is operated to enable the window glass to close when the overload detection switch 24 is closed by increased loads on the motor 1 due to freezing conditions and the like. After the safety circuit cancel switch 26 is manually opened, the relay coil 9 will not be energized and the relay contact 11 will remain closed. Accordingly, when the movable contact 6 is connected to the fixed contact 4 for raising, the motor 1 continues to raise the window glass even if the overload detection switch 24 is closed.

When more than two windows are glazed, the above-mentioned apparatus must be provided for each window. Meanwhile, it is possible by appropriate selection of the time constant for the condenser charging circuit to set the duration of a continued lowering of the window glass upon the motor load exceeding a certain limit.

What is claimed is:

1. A powered window regulator comprising a motor assembly including window raising and window lowering circuits for raising and lowering a window glass, a start switch for the motor having a contact for connecting the window-raising circuit with the motor and a contact for connecting the window-lowering circuit with the motor, an overload detection switch associated with the motor constructed and arranged to close when the load on the motor exceeds a predetermined normal value, a motor field control relay activated when the overload detection switch is closed for breaking the window raising circuit and closing the window-lowering circuit of the motor assembly, a delay relay circuit associated with the motor field control relay for maintaining the motor field control relay activated a predetermined time after the overload detection switch opens, and a manually operable safety circuit cancelling switch for deactivating the motor field control relay whereby the window glass may be elevated to its closed position by the motor assembly regardless of the load on the motor, the relay control circuit for maintaining the motor field control relay activated including an electrical condenser adapted to be discharged when the overload detection switch is closed and charged when the overload detection switch is open, the relay control circuit maintaining the motor field control relay activated except when the electrical condenser is fully charged or the safety circuit switch is opened, and the motor field control relay being activated while both the overload detection switch and the safety circuit cancel switch are closed, the condenser being connected to the base of a transistor with the emitter of the transistor connected to a power source and its collector connected via a relay coil to a ground whereby the transistor may become continuous by the charge current and discharge current of the condenser, two relay contacts that close when the relay coil is energized, one of the two relay contacts being connected to the motor field control relay and the other of the contacts being connected via the contact for raising to the self-holding circuit of the relay coil.

2. A powered window regulator comprising a motor assembly including window raising and window lowering circuits for raising and lowering a window glass, a start switch for the motor having a contact for connecting the window-raising circuit with the motor and a contact for connecting the window-lowering circuit with the motor, an overload detection switch associated with the motor constructed and arranged to close when the load on the motor exceeds a predetermined normal value, a motor field control relay activated when the overload detection switch is closed for breaking the window-raising circuit and closing the window-lowering circuit of the motor assembly, a delay relay circuit associated with the motor field control relay for maintaining the motor field control relay activated a predetermined time after the overload detection switch opens, and a manually operable safety circuit cancelling switch for deactivating the motor field control relay whereby the window glass may be elevated to its closed position by the motor assembly regardless of the load on the motor, the relay control circuit for maintaining the motor field control relay activated including an electrical condenser adapted to be discharged when the overload detection switch is closed and charged when the overload detection switch is open, the relay control circuit maintaining the motor field control relay activated except when the electrical condenser is fully charged or the safety circuit switch is opened, and a circuit being formed that connects the motor assembly to a power source via the start switch, the motor field control relay being arranged in parallel to that circuit, a relay coil connected to the power source via a circuit connecting the condenser in parallel to a series circuit of the overload detection switch and the safety circuit cancel switch, and the relay coil and the motor field control relay being connected in parallel to the power source.